United States Patent [19]
Peltz et al.

[11] 3,896,424
[45] July 22, 1975

[54] SENSING APPARATUS INCLUDING LATCHING MEANS

[75] Inventors: John R. Peltz; Nikolaus A. Szeverenyi, both of Warren, Pa.

[73] Assignee: GTE Sylvania Incorporated, Stamford, Conn.

[22] Filed: Jan. 4, 1974

[21] Appl. No.: 430,700

Related U.S. Application Data

[63] Continuation-in-part of Ser. No. 236,149, March 20, 1972.

[52] U.S. Cl. ............... 340/244 R; 340/332; 307/278
[51] Int. Cl. ........................................... G08b 21/00
[58] Field of Search ...................... 340/332, 244 R

[56] References Cited
UNITED STATES PATENTS

| | | | |
|---|---|---|---|
| 2,769,121 | 10/1956 | Rogoff | 340/244 R |
| 3,432,840 | 3/1969 | Neapolitakis | 340/244 R |
| 3,813,629 | 5/1974 | Szeverenyi et al. | 340/244 R |

Primary Examiner—Thomas B. Habecker
Attorney, Agent, or Firm—Norman J. O'Malley; Lawrence R. Fraley; John C. Fox

[57] ABSTRACT

A sensing apparatus is provided which includes a latching means for providing a steady electrical signal from a sensor device to a current indicating means in the sensing apparatus. The latching means, which may be energized by heat, light, or electrical current, assures a steady signal upon the initial engagement of a free end of the heat responsive means and a first spaced apart portion of the heater means within the sensor device.

8 Claims, 6 Drawing Figures

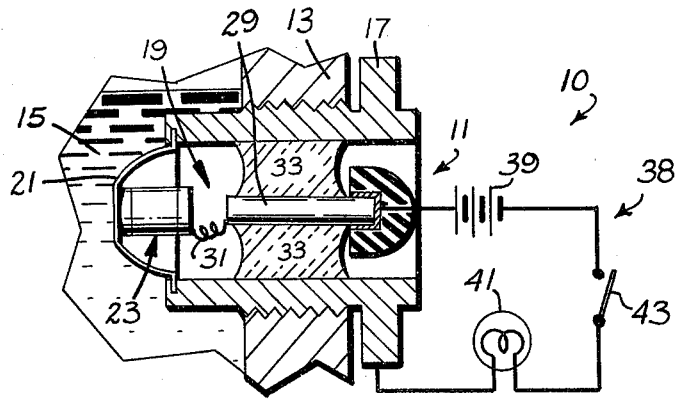
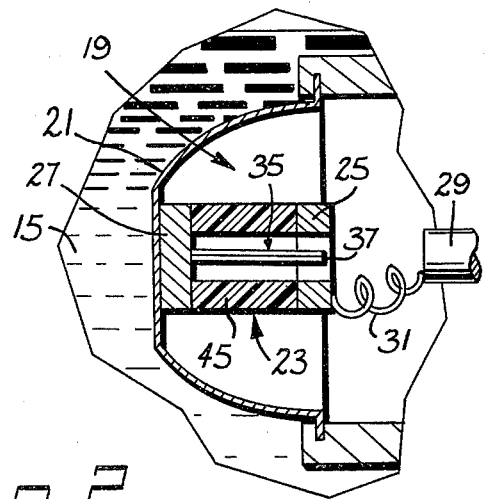
Fig. 1  Fig. 2
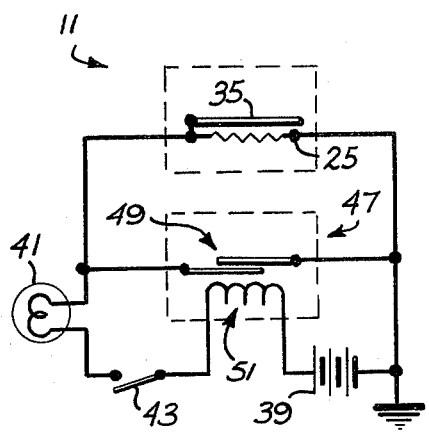
Fig. 3A
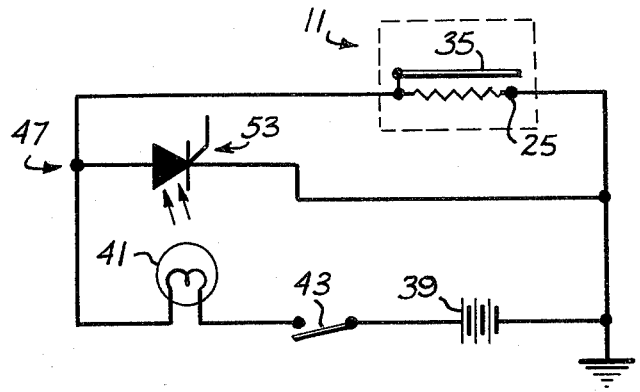
Fig. 4
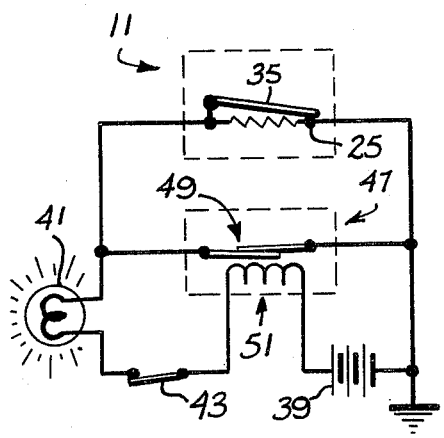
Fig. 3B
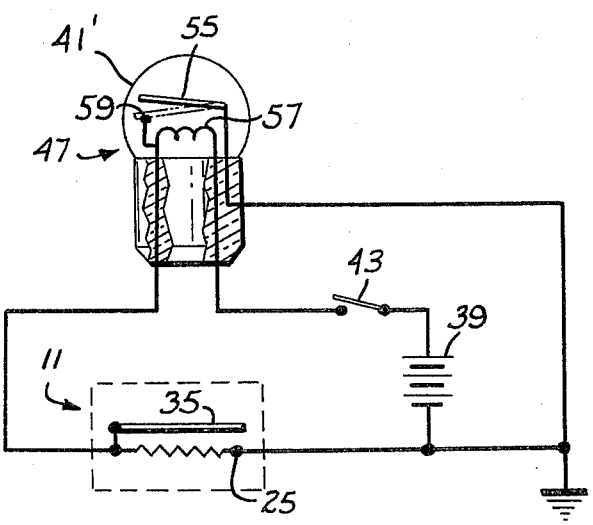
Fig. 5

SENSING APPARATUS INCLUDING LATCHING MEANS

CROSS-REFERENCE TO COPENDING APPLICATIONS

The present application is a continuation-in-part of a copending application U.S. Ser. No. 236,149, titled "Fluid Level Sensor", filed Mar. 20, 1972 and assigned to the same assignee as the present invention.

BACKGROUND OF THE INVENTION

This invention relates to fluid level sensing apparatus for providing a signal indication when the fluid in the container is below a predetermined level.

The sensing apparatus disclosed in the above-described copending application comprises a sensing device and a means for sensing when a free end of the electrical conductive heat responsive means within the device engages a first spaced apart electrically conductive portion of the heater means of the device. The sensor device comprises a housing member, a tip member secured to the housing, an electrically resistive heater means having first and second spaced apart electrically conductive portions, and an electrically conductive heat responsive means secured at one end to the second spaced apart portion of the heater means and having a free end adapted for engaging the first spaced apart portion of the heater means only when the temperature surrounding said heat responsive means exceeds a predetermined level. The means for sensing when the free end of the heat responsive means and the first spaced apart portion are engaged comprises an electrical circuit including a source of electrical potential operatively connected to the heat responsive means and the first spaced apart portion and a current indicating means for indicating electrical current in the circuit when the heat responsive means are engaged.

A unique feature of the sensing apparatus disclosed in Ser. No. 236,149 is its inherent ability to provide an intermittent signal upon detecting either the presence or absence of fluid about its tip member. To provide a steady indication of a fluid condition would require only minor mechanical alterations or additions to the sensor. Conversely, the present invention utilizes electrical components to provide a means whereby a steady signal is provided the current indicating means upon the initial engagement of the free end of the heat responsive means and the described first spaced apart portion of the heater means.

OBJECTS AND SUMMARY OF THE INVENTION

It is, therefore, a primary object of this invention to provide a latching means for a sensing apparatus which provides a steady electrical signal from the sensor device to the current indicating means of the sensing apparatus. It is a further object of the invention to provide a latching means for the above-described sensing apparatus which operates in a relatively simple manner and is relatively inexpensive to manufacture.

The foregoing objects are achieved in one aspect of the invention by the provision of a latching means which provides a steady electrical signal from the sensor device to the current indicating means of the sensing apparatus. This latching means comprises a switching means which is adapted for closing upon the initial engagement of the free end of the heat responsive means and the first spaced apart portion of the heater means. Once the switching means is closed, a continuously steady current flows through the described indicating means and first spaced apart portion of the heater means, thus providing a steady signal.

BRIEF DESCRIPTION OF THE DRAWINGS

FIG. 1 is a side elevation view, partly in section, of a sensing apparatus as disclosed in Ser. No. 236,149;

FIG. 2 is an enlarged view of the apparatus of FIG. 1;

FIG. 3A is a schematic view of one embodiment of the present invention;

FIG. 3B is a schematic view of the embodiment of FIG. 3A during energization of the latching means;

FIG. 4 is a schematic view of another embodiment of the present invention; and

FIG. 5 is a schematic view of still another embodiment of the present invention.

DETAILED DESCRIPTION OF THE PREFERRED EMBODIMENTS

For a better understanding of the present invention together with other and further objects, advantages and capabilities thereof, reference is made to the following disclosure and appended claims in connection with the above-described drawings.

In FIG. 1 there is illustrated a sensing apparatus 10 which comprises a sensor device 11 adapted for being positioned within a container 13 and for sensing the condition of a fluid 15 within the container. Sensor device 11 comprises a housing 17 which defines a chamber 19, an electrically conductive tip member 21 secured to housing 17 and forming a closure for chamber 19 to prevent entrance of fluid 15 therein, and an electrically resistive heater means 23. Heater means 23 has first and second spaced apart electrically conductive portions 25 and 27 thereon, as better illustrated in FIG. 2. As illustrated in FIG. 1, an electrical and heat conductive member 29 is also provided in sensor 11 and electrically connected to first spaced apart portion 25 of heater means 23 via wire 31. Heat conductive member 29 is positioned within an electrically insulative material 33, preferably a glass composition, in the manner indicated. It is to be understood that member 29, as well as wire 31, are both optional components in sensor device 11 as it can be clearly seen that electrically resistive heater means 23 could extend on through chamber 19 to the external confines of the sensor device.

As illustrated in FIG. 2, positioned substantially within heater means 23 is a heat responsive means 35 which is fixedly positioned at one end to second spaced apart portion 27 in the manner indicated. Heat responsive means 35 has a free end 37 which is adapted for engaging first spaced apart portion 25 of heater means 23 when the temperature difference surrounding heat responsive means 35 exceeds a predetermined level.

Sensing apparatus 10 further comprises a means 38 for sensing when the above-described free end of heat responsive means 35 engages first spaced apart portion 25. Means 38 comprises an electrical circuit having a source of electrical potential 39 operatively connected to the heat responsive means and first spaced apart portion 25, and a current indicating means 41 for indicating electrical current in the circuit when the heat responsive means are engaged. Switch member 43 is optionally provided as a means for opening and closing the circuit.

In operation, electrical current from potential source 39 flows through sensor device 11 and thus through the resistive heater means 23. This current returns to indicating means 41 through tip 21 and housing 17. With fluid 15 about tip 21, the heat generated by heater means 23 is transmitted from second spaced apart portion 27 through tip 21 and into fluid 15. Heat is also conducted away through wire 31 and into member 29 where it further dissipates into material 33 and eventually into housing 17. When the fluid drops below tip 21, an imbalance in this heat dissipation results with a substantial increase in temperature about the heat responsive means 35, causing it to deflect and engage first spaced apart portion 25. When this occurs, electrical current going from member 29 through wire 31 and first spaced apart portion 25 is permitted to bypass the resistive portion 45 of heater means 23 and pass directly to second spaced apart portion 27 through the now deflected heat responsive means 35. This, of course, occurs because the resistance in the heat responsive means 35 is substantially less than that of the resistive material 45. With the resistive material removed from the circuit, an increased amount of electrical current passes through indicating means 41 and is now sufficient to energize this means.

Indicating means 41 is thus only energized when free end 37 of heat responsive means 35 engages first spaced apart portion 25 of heater means 23. After a period of time, the resistive heater means substantially cools due to the lack of electrical current therethrough. This cooling in turn causes heat responsive means 35 and first spaced apart portion 25 to become disengaged and the electrical current through sensor device 11 must pass through the resistive material 45 once again. The above-described sequential opertion will continue to occur as long as fluid 15 is not substantially in contact with tip 21.

To provide a means whereby indicating means 41 will become substantially steadily energized after the initial engagement of heat responsive means 35 and first spaced apart portion 25, means for sensing 38 further includes a latching means for providing a steady signal from the sensor to the current indicating means. This latching means comprises a switching means 47 as illustrated in the schematic views in FIG. 3A and 3B. Switching means 47, illustrated as a reed switch 49 which is electrically energized by coil 51, is positioned in the circuit in the manner indicated. Sensor 11, current indicating means 41, switch member 43, and potential source 39 are also schematically illustrated. In operation, when heat responsive means 35 is not engaged with first spaced apart portion 25 (illustrated as an electrical terminal), electrical current passes through the resistor of sensor 11 and is thus at a relatively low level in the circuit. This low level is insufficient to energize indicating means 41 as well as coil 51. Accordingly, no indication is given and reed switch 49 remains open. It is understood switch member 41 is closed during operation of the sensing apparatus.

In FIG. 3B, heat responsive means 35 has engaged first spaced apart portion 25, thus providing a bypass to the sensor's resistor. At this time, the current level in the circuit raises appreciably and is sufficient to energize indicating means 41 and coil 51. Consequently reed switch 49 is electrically induced to the shown closed position. Should heat responsive means 35 and first spaced apart portion 25 become disengaged once again, indicating means 41 will still remain energized and provide a continuous indication. This occurs as a result of sensor device 11 now being bypassed in the circuit by switching means 47.

Another embodiment for switching means 47 is illustrated in FIG. 4 wherein a light activated silicon controlled rectifier 53 hereinafter referred to as LASCR is utilized. LASCR 53 is positioned in the near proximity to indicating means 41 and is adapted for receiving light therefrom. As in FIGS. 3A and 3B, potential source 39, switch member 43 and sensor 11 are positioned in the circuit.

The operation of this particular embodiment is substantially similar to that of reed switch 49 with the exception that LASCR 53 is energized upon receiving a preestablished amount of light, as reed switch 49 was energized by the passage of electrical current through coil 51. In operation when switch member 43 is closed and responsive means 35 and first spaced apart portion 25 are disengaged, the electrical current passing through the circuit is insufficient to energize indicating means 41. However, once heat responsive means 35 and first spaced apart portion 25 make contact thus bypassing the resistor, electrical current reaches a level sufficient to energize indicating means 41 which in turn triggers LASCR 53. Current now flows through LASCR 53 and sensor 11 is bypassed in the circuit. Accordingly, should responsive means 35 and first spaced apart portion 25 disengage, indicating means 41 will remain energized and continue to trigger LASCR 53.

With particular reference to FIG. 5, there is illustrated yet another embodiment of switching means 47 which provides a steady indication upon the initial engagement of heat responsive means 35 and first spaced apart portion 25 and sensor 11. In this embodiment, switching means 47 comprises a heat responsive member 55, preferably a bimetal, located in the manner indicated in current indicating means 41'. Switch member 43 and potential source 39 are also shown. In operation, when heat responsive means 35 and first spaced apart portion 25 are disengaged, a relatively low current flow through indicating means 41' fails to energize this means. However, once the responsive means makes initial contact with first spaced apart portion 25, indicating means 41' is activated. Accordingly, the heat generated by the filament 57 of the indicating means causes heat responsive member 55 to deflect and make contact with terminal 59 (this deflection illustrated in phantom). As a result of this deflection, a means for bypassing sensor 11 is assured and a continuous relatively high amount of electrical current flows steadily through filament 57. In doing so, indicating means 41' remains continuously energized providing the required indication with heat responsive member 55 remaining in contact with terminal 59. The latter described operation results in sensor 11 being bypassed in the circuit regardless of the subsequent disengagement of heat responsive means 35 and first spaced apart portion 25. As can be seen, a steady indication is achieved.

Thus, there has been shown and described a means whereby a steady electrical signal is provided from the sensor device to the current indicating means in the described sensing apparatus. By utilizing the components as illustrated, or suitable substitutes therefor, it has also been shown that the abovedescribed latching means can be produced inexpensively and is relatively simple in operation.

While there has been shown and described what are at present considered the preferred embodiments of the invention, it will be obvious to those skilled in the art that various changes and modifications may be made therein without departing from the scope of the invention as defined by the appended claims.

What is claimed is:

1. A sensing apparatus comprising:

a sensor device including a housing member defining a chamber, an electrically conductive tip member adapted for being exposed to a fluid, said tip member secured to said housing and forming a closure for said chamber to prevent fluid entrance into said chamber, an electrically resistive heater means within said chamber having first and second spaced apart electrically conductive portions, said second electrically conductive portion in heat conductive relationship to said electrically conductive tip member, and an electrically conductive heat responsive means secured at one end to said second spaced apart portion of said heater means and having a free end adapted for engaging said first spaced apart portion of said heater means only when the temperature surrounding said electrically conductive heat responsive means exceeds a predetermined level; and means for sensing when said free end of said electrically conductive heat responsive means and said first spaced apart portion of said heater means are engaged, said sensing means including an electrical circuit comprising a source of electrical potential operatively connected to said electrically conductive heat responsive means and said first spaced apart portion of said heater means, a current indicating means for indicating electrical current in said circuit when said free end and said first spaced apart portion are engaged, and a latching means for providing a steady electrical signal to said current indicating means after the initial engagement of said free end of said heat responsive means and said first spaced apart portion of said heater means.

2. A sensing apparatus according to claim 1 wherein said latching means for providing a steady electrical signal to said current indicating means comprises a switching means operatively connected to said source of electrical potential, said current indicating means, said heat responsive means, and said first spaced apart portion of said heater means, said switching means adapted for closing upon the initial engagement of said free end of said heat responsive means with said first spaced apart portion of said heater means.

3. A sensing apparatus according to claim 2 wherein said switching means is electrically energized.

4. A sensing apparatus according to claim 3 wherein said electrically energized switching means is a reed switch.

5. A sensing apparatus according to claim 2 wherein said switching means is light actuated.

6. A sensing apparatus according to claim 5 wherein said light actuated switching means is a light actuated silicon controlled rectifier.

7. A sensing apparatus according to claim 2 wherein said switching means is heat actuated.

8. A sensing apparatus according to claim 7 wherein said heat acutated switching means comprises a bimetallic switch.

* * * * *